M. C. LA BONTE.
SUN AND RAIN SHIELD FOR AUTOMOBILES.
APPLICATION FILED MAR. 4, 1920.
1,367,152.  Patented Feb. 1, 1921.
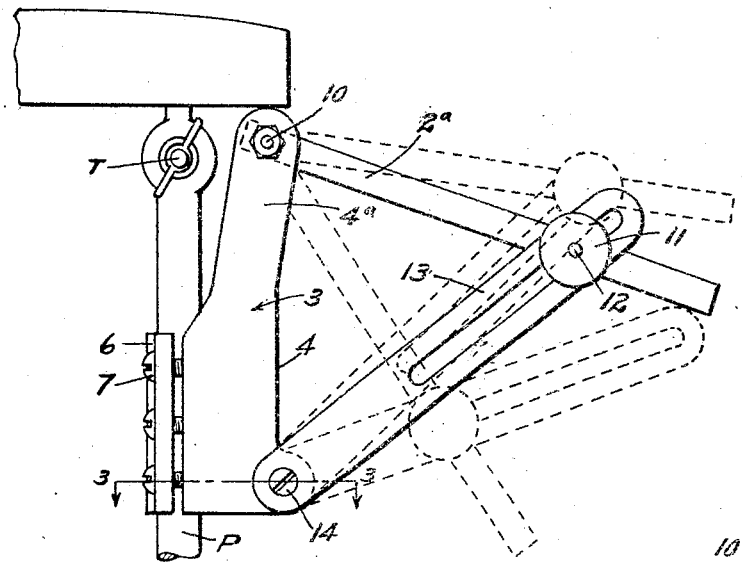
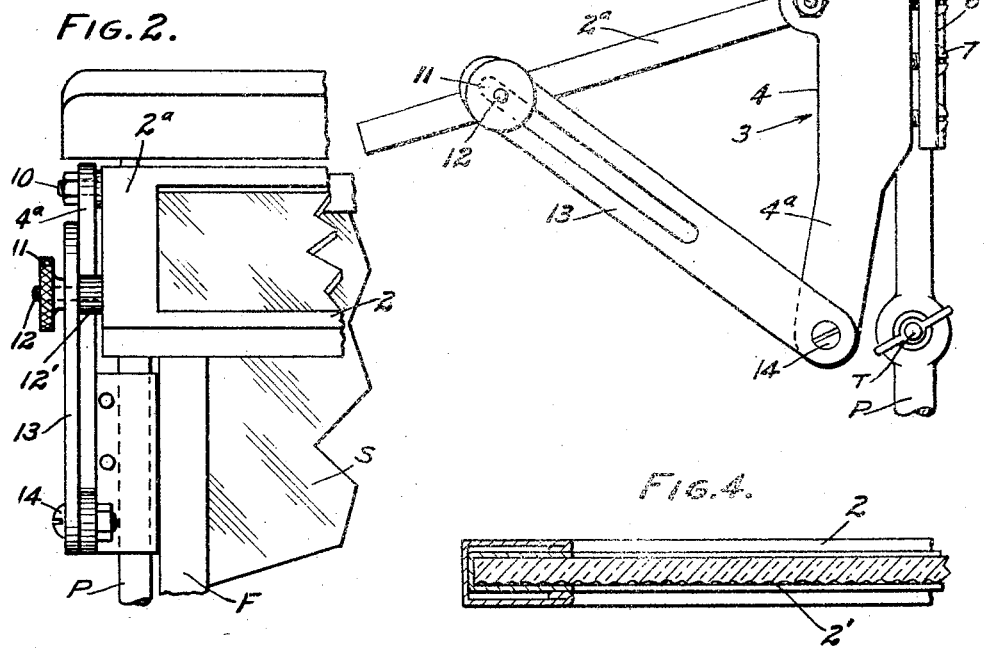
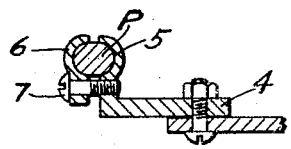
INVENTOR
MONTE C. LaBONTE
BY Hazard & Miller
ATT'YS.

UNITED STATES PATENT OFFICE.

MONTE C. LA BONTE, OF LOS ANGELES, CALIFORNIA.

SUN AND RAIN SHIELD FOR AUTOMOBILES.

1,367,152.     Specification of Letters Patent.     Patented Feb. 1, 1921.

Application filed March 4, 1920. Serial No. 363,170.

*To all whom it may concern:*

Be it known that I, MONTE C. LA BONTE, a citizen of the United States, residing at Los Angeles, in the county of Los Angeles and State of California, have invented new and useful Improvements in Sun and Rain Shields for Automobiles, of which the following is a specification.

This invention relates to vehicles and particularly to sun and rain shields for automobiles. The invention has for its object to provide an attachment by which an auxiliary shield can be attached to the usual wind shield of an automobile and especially has for an object to provide an attachment that can be applied to usual and standard forms of wind shield supports of different structural forms. The invention consists of the construction, the combination, and in details and arrangements of the parts, an embodiment of which invention is illustrated in the accompanying drawings and described and claimed herein.

Figure 1 is a side elevation of the upper portion of one form of support and a portion of an automobile top; and to which support the attachment is applied in one position.

Fig. 2 is a front elevation of the structure shown in Fig. 1.

Fig. 3 is a sectional view on line 3—3 of Fig. 1.

Fig. 4 is a cross section through one form of frame and a plate of glass mounted therein.

Fig. 5 is a side elevation of the attachment as applied to a different form of wind shield support.

As is well known, automobiles are provided with wind shields a portion of one of which is indicated at S in Fig. 2, this wind shield having a side frame part F that is connected to an adjacent upright or support in the frame of a post P. Different forms of wind shields and different forms of their supporting posts P are in general use and in Fig. 1 the post P has at its upper end a pivot device or pin forming a trunnion T by which the wind shield upper section is secured to the post P. In Fig. 5 a different form of post P is indicated in which the trunnion T is disposed materially lower than is indicated in Fig. 1.

One of the purposes of the present invention is to provide means for attaching a rain and sun shield 2 to the different types of supporting parts on posts P, irrespective of the location or the pivot or trunnion T. To that end, the invention consists of a set of bracket members 3 that are made of right and left hand forms so that they can be respectively attached to the right and left hand posts P. Each of the brackets comprises a front main body portion 4 having an L shaped cross section the flange of which is preferably formed with a concave seat 5 to fit against adjacent edge or surface of a post P as shown in Fig. 3 and in opposite position to a complementary clamp leaf 6 also having a seat to receive the post P; the clamp leaf 6 being applied to the back of the post and the clamp seat 5 at the front and these parts being drawn toward each other by a set of clamp screws 7. The right hand clamp hanger 3 as shown in Figs. 1 and 3 has the clamp seat or flange 5 on its inner or left hand face and conversely the left hand clamp (not shown) has its clamp seat on its inner or right hand face.

The hanger body 4 has at one end an upwardly extending and forwardly projecting offset on 4ᵃ so that it clears the enlarged portion of the post P through which the trunnion T passes and enables the ready turning of a winged-nut on the trunnion to lock the wind shield S in desired position. The upper end of the forwardly extending offset on 4ᵃ is provided with an aperture to receive a pivot pin 10 extending from the frame 2ᵃ of the shield 2 which is adapted to swing on the pivot bearing to positions as shown in full and the dotted lines of Fig. 1, at any of which positions it may be locked by a suitable device as, for instance, a nut 11 threaded on a screw 12 extending from and secured on the side of the frame 2ᵃ the screw being movable in the slot of a link 13 that is pivoted at 14 on the lower end of the hanger or bracket 3. It is understood that there is one of the clamp devices at opposite ends of the frame 2ᵃ. As shown in Figs. 1 and 2 the frame 2ᵃ is pivoted between the inner face of the end brackets of which one is shown at 3 and the clamping link and brace 13 is pivoted on the outside surface of its relative bracket 3; there being a spacer at 2′ at the base of the screw 12 on each end of the frame 2ᵃ.

In the event that it is desirable to mount the improved attachment with the shield 2 upon post P of the construction shown in Fig. 5 then the brackets or hangers 3 are interchanged as between the right and left hand post and each bracket is then applied in a position inverted in respect to the position in Fig. 1 and set as shown in Fig. 5 so that its offset on 4ª projects front of the trunnion parts T and does not interfere with the ready setting of the wind shield thereon.

While any suitable form of member to form the shield 2 may be utilized, preferably one face of the member 2 which may be glass is corrugated as shown at 2' and the other surface may be frosted or otherwise rendered translucent.

Various changes may be made without departing from the spirit of my invention as claimed.

What is claimed is:

1. An attachment for securing a rain and sun shield to vehicles having wind-shield supports of different types, comprising right and left hand brackets, each having a body portion with a clamp on its rear side, the opposite side having an upper forwardly and upwardly extending arm, and a lower outwardly extending arm the said arms adapted to be offset in front of the structural details of the wind-shield when in normal or inverted position.

2. An attachment for securing a rain and sun shield to vehicles having wind-shield supports of different types, comprising right and left hand brackets, each having a body portion that is substantially L-shaped in cross section, a clamp on the rear side of the lateral leg of said L-shaped body portion, the opposite side having an upper forwardly and upwardly extending arm normally supporting one end of the shield, and a lower outwardly extending arm normally supporting an adjustable brace for the shield, the said arms adapted to be offset in front of the structural details of the wind shield when in normal or inverted positions.

3. An attachment for securing a rain and sun shield to vehicles having wind-shield supports of different types, comprising right and left hand brackets adapted to be interchangeable each having a body portion normally disposed in front of the wind shield and a clamp on its rear side, the opposite side having upper and lower outwardly extending arms interchangeably supporting one end of the shield, and an adjustable brace therefor, the said arms adapted to be offset in front of the structural details of the wind shield when in normal or inverted positions.

4. An attachment for securing a rain and sun shield to vehicles having wind-shield supports of different types, comprising right and left hand brackets adapted to be interchangeable, each having a body portion that is substantially L-shaped in cross section, a clamp on the rear side of the lateral leg of said L-shaped body portion, the opposite side having outwardly extending upper and lower arms, a shield normally supported between the upper arms and adjustable braces normally supported on the lower arms, in front of the structural details of the wind shield, said shield and braces being interchangeably supported when the braces are interchanged and inverted.

In testimony whereof I have signed my name to this specification.

MONTE C. LA BONTE.